United States Patent
Griffin, Jr. et al.

(10) Patent No.: US 8,910,661 B2
(45) Date of Patent: Dec. 16, 2014

(54) VALVE SOUND REDUCING TRIM ASSEMBLY WITH PRESSURE RELIEF MECHANISM

(71) Applicant: Emerson Process Management Regulator Technologies, Inc., McKinney, TX (US)

(72) Inventors: James L. Griffin, Jr., McKinney, TX (US); Matthew W. Hanusa, McKinney, TX (US); Thomas L. Weyer, Jr., McKinney, TX (US); Daniel G. Roper, Lucas, TX (US); Harold J. McKinney, Durant, OK (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 52 days.

(21) Appl. No.: 13/733,619

(22) Filed: Jan. 3, 2013

(65) Prior Publication Data
US 2014/0183384 A1 Jul. 3, 2014

(51) Int. Cl.
- *F16K 47/08* (2006.01)
- *F16K 3/26* (2006.01)
- *G05D 7/01* (2006.01)
- *F16K 47/04* (2006.01)

(52) U.S. Cl.
CPC ............... *F16K 47/04* (2013.01); *F16K 47/08* (2013.01)

USPC ............ 137/625.3; 137/625.33; 137/625.39; 138/43

(58) Field of Classification Search
USPC ............... 137/625.33, 625.3, 625.28, 625.39, 137/625.38, 625.37, 601.2, 601.18; 251/118; 138/40, 43
See application file for complete search history.

(56) References Cited

U.S. PATENT DOCUMENTS

| | | | | | |
|---|---|---|---|---|---|
| 3,049,146 | A | * | 8/1962 | Hayes | 137/517 |
| 3,143,139 | A | * | 8/1964 | Pretti | 137/590 |
| 3,540,484 | A | * | 11/1970 | Brown et al. | 138/43 |
| 4,080,982 | A | | 3/1978 | Maezawa | |
| 4,244,388 | A | * | 1/1981 | Feiss | 137/115.16 |
| 4,718,450 | A | | 1/1988 | Ezekoye | |
| 4,889,158 | A | | 12/1989 | Rice et al. | |
| 2004/0177884 | A1 | * | 9/2004 | Konishi | 137/540 |
| 2004/0262553 | A1 | * | 12/2004 | Boger | 251/118 |
| 2005/0034770 | A1 | * | 2/2005 | Stares et al. | 137/625.3 |
| 2005/0252559 | A1 | * | 11/2005 | McCarty et al. | 137/625.3 |
| 2007/0272316 | A1 | * | 11/2007 | Zecchi et al. | 137/625.33 |

OTHER PUBLICATIONS

Search Report for PCT/US2014/010039, mailed Apr. 24, 2014.
Written Opinion for PCT/US2014/010039, mailed Apr. 24, 2014.

* cited by examiner

*Primary Examiner* — Elizabeth Houston
*Assistant Examiner* — Michael R Reid

(57) ABSTRACT

A cage for a control valve trim assembly includes a cage body having an opening at one end and a wall extending from the opening, a plurality of cage openings disposed in the wall, and a pressure relief mechanism disposed in the cage wall.

10 Claims, 3 Drawing Sheets

VALVE SOUND REDUCING TRIM ASSEMBLY WITH PRESSURE RELIEF MECHANISM

FIELD OF THE DISCLOSURE

The disclosure generally relates to valve sound reducing trim assemblies and more specifically to sound reducing trim assemblies having a pressure relief mechanism.

BACKGROUND OF THE DISCLOSURE

Fluid valves control the flow of fluid from one location to another. When the fluid valve is in a closed position, high pressure fluid on one side is prevented from flowing to a lower pressure location on the other side of the valve. The pressure differences between an inlet and an outlet of the control valve, along with a tortuous flow path through the control valve, produce turbulent fluid flow downstream of the control valve, which causes unwanted and potentially harmful noise.

In an attempt to reduce noise, multi-port cages or trims have been used in some regulators to reduce the pressure drop across the cage and to smooth downstream flow. In these cases, a trim assembly may be used that includes a cage with a plurality of openings. The openings may be sized and shaped to characterize fluid flow through the trim assembly. In one example, the openings characterize the fluid flow by reducing noise.

Often the openings are quite small and may become easily clogged. As a result, manufacturers typically recommend filtering the process fluid before it enters the regulator to remove impurities that may clog the openings. However, even with manufacturer recommendation, users often do not filter the process fluid, which leads to clogged openings. When enough openings become clogged, the regulator will no longer function properly and the clogged openings may lead to a potentially dangerous overpressure condition because fluid is prevented from flowing. This overpressure condition in some cases may cause the regulator to fail, sometimes catastrophically.

SUMMARY

In accordance with one exemplary aspect of the present invention, a fluid valve includes a valve body having a fluid inlet and a fluid outlet connected by a fluid passageway and a trim assembly disposed within the fluid passageway. A fluid control member is movably disposed within the fluid passageway, the fluid control member cooperating with the trim assembly to control fluid flow through the fluid passageway. The trim assembly includes a cage with a cage wall and a pressure relief mechanism disposed in the cage wall.

In another exemplary aspect of the present invention, a cage for a control valve trim assembly includes a cage body having an opening at one end and a wall extending from the opening, a plurality of openings disposed in the wall, and a pressure relief mechanism disposed in the cage wall.

In further accordance with any one or more of the foregoing aspects, a fluid valve (or a cage for a fluid valve) may further include any one or more of the following preferred forms.

In some preferred forms, the pressure relief mechanism is a gate. In other preferred forms, the gate is pivotably attached to the cage wall by a hinge. In yet other preferred forms, the hinge has an axis of rotation that is substantially parallel to a longitudinal axis of the cage wall. In yet other preferred forms the gate is disposed in a notch formed in the cage wall. In yet other preferred forms, the gate is biased to a closed position by a biasing element. In yet other preferred forms, the biasing element is a spring. In yet other preferred forms, the spring is attached to a distal end of the gate. In yet other preferred forms, the cage wall includes a plurality of posts that separate the notches. In yet other preferred forms, the spring is attached to a post. In yet other preferred forms, the hinge has an axis of rotation that is substantially perpendicular to a longitudinal axis of the cage body. In yet other preferred forms, the gate includes a bracket that is secured to the cage wall and a pivotable flap. In yet other preferred forms, the pivotable flap covers an auxiliary opening formed in the cage wall. In yet other preferred forms, the pressure relief mechanism includes a bracket portion that is attached to the cage wall and an overhang portion attached to the bracket portion, the overhang portion being separated radially from an auxiliary opening in the cage wall. In yet other preferred forms, a cover is attached to the overhang portion. In yet other preferred forms, the cover is attached to the overhang portion with a spring. In yet other preferred forms, the pressure relief mechanism comprises a plurality of flexible leaflets.

Figure 1:
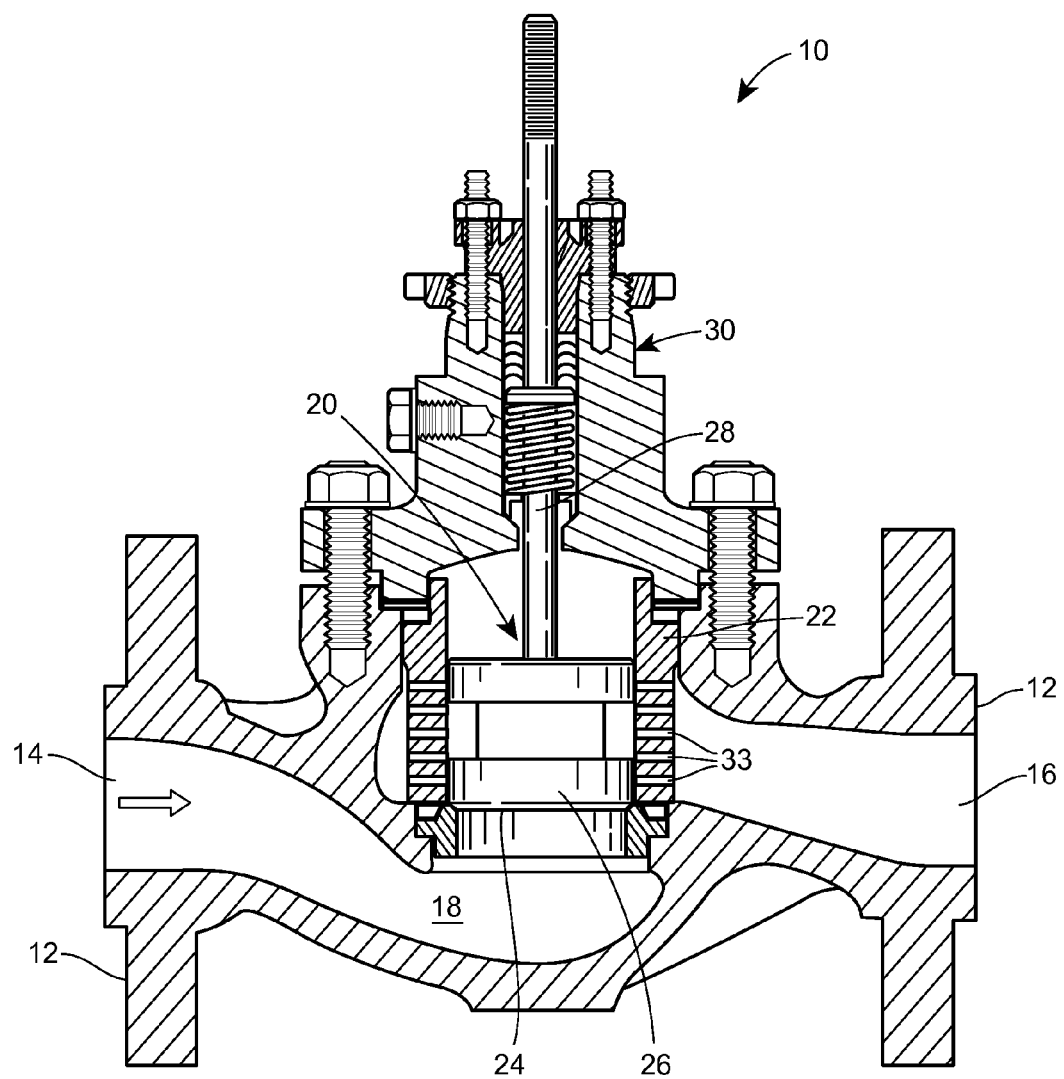
FIG. 1 is a side cross-sectional view of a regulator valve having a trim cage with a pressure relief mechanism.
Figure 2:
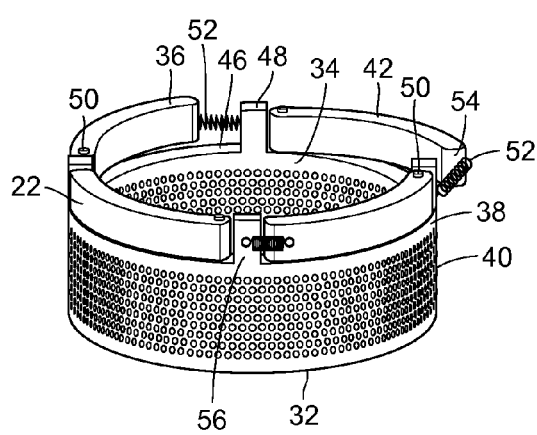
FIG. 2 is a perspective view of a trim cage having a pressure relief mechanism.
Figure 3:
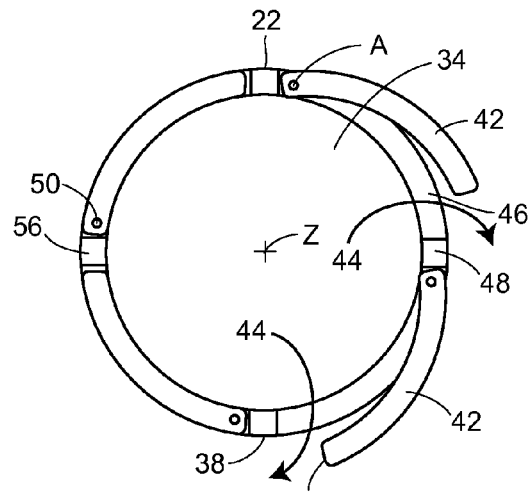
FIG. 3 is a top view of the trim cage of FIG. 2.
Figure 4:
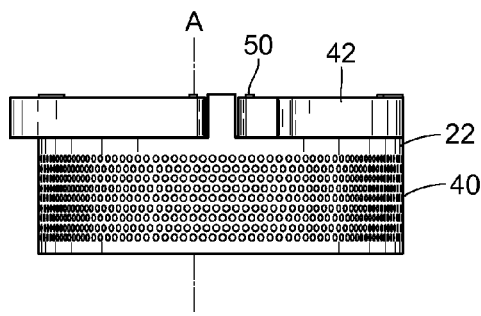
FIG. 4 is a side view of the trim cage of FIG. 2.
Figure 5:
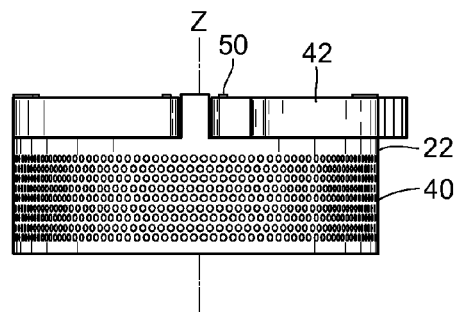
FIG. 5 is another side view of the trim cage of FIG. 2.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the invention.

DETAILED DESCRIPTION

The trim assemblies described herein advantageously provide a pressure relief mechanism built into the trim assembly to relieve pressure if openings in the trim assembly become clogged. The disclosed trim assemblies may be used as stand-alone trim assemblies, or the disclosed cage openings may be combined with other trim assemblies to produce trim assemblies that characterize fluid flow while having a pressure relief capability. The disclosed trim assemblies ensure that process fluid continues to flow to downstream customers even if the openings are clogged. The disclosed trim assemblies may be particularly useful in regulating gas flows.

Turning now to FIG. 1, a control valve 10 includes a valve body 12 having a fluid inlet 14 and a fluid outlet 16 connected by a fluid passageway 18. A trim assembly 20 is disposed within the valve body 12 between the fluid inlet 14 and the fluid outlet 16. The trim assembly 20 includes a cage 22 and a seat 24. A fluid control member, such as a plug 26 is disposed within the cage 22 and the plug 26 interacts with the seat 24 to control fluid flow through the valve body 12. A stem 28 is connected to the plug 26 at one end and an actuator 30 at another end. The actuator 30 controls movement of the plug 26 within the cage 22.

The cage 22 may include a plurality of cage openings 40. The plurality of cage openings 40 reduces cavitation as fluid flows through the cage 22, thus reducing noise in the fluid flow downstream of the cage 22.

As illustrated in FIGS. 2-5, one embodiment of a cage 22 includes an opening at a first end 32 and an opening at a second end 36. A cage wall 38 extends between the first end 32 and the second end 36, the cage wall 38 forming a hollow central bore 34 within which the valve plug 26 slides to control fluid flow through the cage 22. The plurality of cage openings 40 is formed in the cage wall 38. The plurality of cage openings 40 may characterize fluid flow through the cage 22 by, for example, reducing cavitation and noise.

One or more pressure relief devices, such as gates 42, may be disposed in the cage wall 38. The gates 42 may be movably attached to the cage wall 38 so that the gates open to form a secondary flow path 44 through the cage wall 38. In the embodiment illustrated in FIGS. 2-5, the gates 42 are seated in corresponding recesses or notches 46 formed in an upper surface 48 of the cage wall 38. The gates 42 may be pivotably attached to the cage wall 38 by a hinge 50. The gates 42 may be biased towards a closed position by a biasing element, such as a spring 52 (which is not illustrated in FIG. 3 to more clearly show the gate 42 and the hinge 50). The spring 52 may be attached to a distal end 54 of the gate 42, opposite the hinge 50, in one embodiment. In other embodiments, the biasing element may be located on, or attached to, the hinge 50. In yet other embodiments, the gate 42 may slide to open the secondary flow path 44, rather than pivot.

The biasing element or spring 52 may be set to activate when a desired pressure differential between an inside of the cage wall 38 and an outside of the cage wall 38 is reached. For example, the spring 52 may be sized to provide enough closing force to keep the gate 42 closed until a predetermined pressure differential is reached. When the predetermined pressure differential is reached, the fluid pressure overcomes the biasing force provided by the spring 52, which causes the gate 42 to pivot open, exposing the secondary flow path 44. As a result, fluid continues to flow through the cage 38 even if some or most of the openings in the plurality of openings 40 become clogged.

In the embodiment illustrated in FIGS. 2-5, the hinge 50 has a pivot axis A that is oriented parallel to a longitudinal axis Z of the cage 22. Thus, the gate 42 pivots radially outward, away from the cage wall 38 to open the secondary flow path. In other embodiments, the hinge 50 may have a pivot axis that is oriented perpendicular to the longitudinal axis Z of the cage 22, which would allow the gate to pivot in an axial direction relative to the cage wall 38.

One or more posts 56 may separate the notches 46. The posts 56 may serve as anchor points for the spring 52 and/or as anchoring locations for the hinge 50. In other embodiments, the posts 56 may be removed so that the gates 42 generally abut one another.

Figure 6:
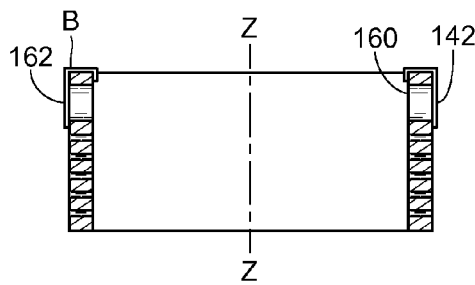
FIG. 6 is a side cross-sectional view of an alternate embodiment of a trim cage having a pressure relief mechanism.
Figure 7:
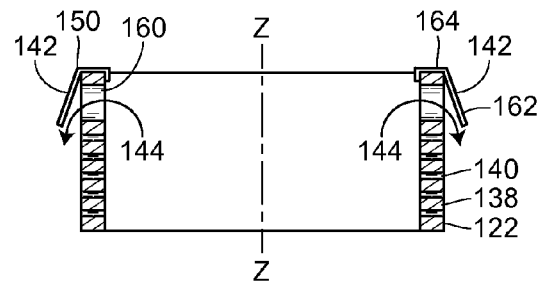
FIG. 7 is a side-cross sectional view of the trim cage of FIG. 6, with the pressure relief mechanism being in an open position.

Turning now to FIGS. 6 and 7, a second embodiment of a cage 122 having a pressure relief mechanism is illustrated. The cage 122 includes a cage wall 138 having a plurality of cage openings 140, similar to the cage wall 38 and plurality of cage openings 40 of the embodiment illustrated in FIGS. 2-5. An auxiliary opening 160 is disposed in the cage wall 138. The auxiliary opening 160 forms a secondary flowpath 144 through the cage wall 138. A gate 142 is attached to the cage wall 138 proximate the auxiliary opening 160. The gate 142 may be pivotably attached to the cage wall 138 by a hinge 150. The hinge 150 may be biased by a biasing element, such as a spring (not shown), so that the gate 142 is biased to a closed position. In other embodiments, the hinge 150 may be a living hinge. When fluid pressure exceeds a predetermined threshold, the biasing force is overcome and the gate 142 pivots to an open position, thereby allowing fluid to flow through the auxiliary opening 160.

In the embodiment illustrated in FIGS. 6 and 7, the hinge 150 has a pivot axis B that is oriented substantially perpendicular to a longitudinal axis Z of the cage wall 138. As a result, the gate 142 pivots radially outward, away from the auxiliary opening 160 when fluid pressure exceeds the predetermined threshold. The gate 142 may include a pivotable flap 162 and a bracket 164 that secures the gate 142 to the cage 122.

Figure 8:
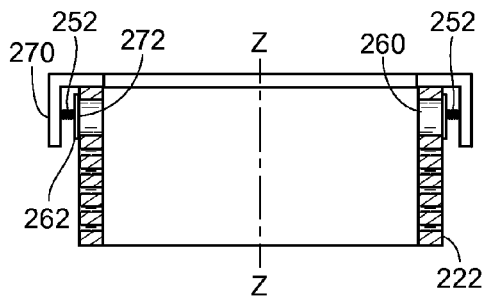
FIG. 8 is a side cross-sectional view of yet another alternate embodiment of a trim cage having a pressure relief mechanism.
Figure 9:
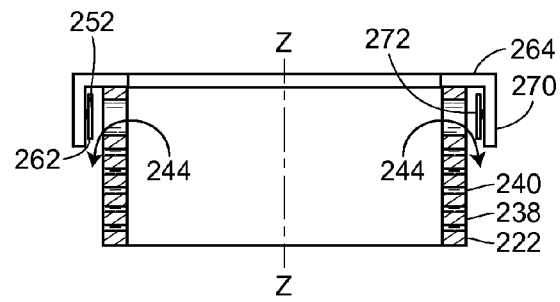
FIG. 9 is a side-cross sectional view of the trim cage of FIG. 8, with the pressure relief mechanism being in an open position.

The embodiment illustrated in FIGS. 8 and 9 is similar to the embodiments illustrated in FIGS. 1-7 in that the cage 222 includes a cage wall 238 and a plurality of cage openings 240 in the cage wall 238. The cage 222 also includes an auxiliary opening 260 that forms a secondary flow path 244. A bracket 264 is disposed at one end of the cage wall 238. The bracket 264 includes an overhang portion 270 that extends radially outward from the cage wall 238 and axially over the auxiliary opening 260. However, the overhang portion 270 is axially separated from the auxiliary opening 260 by a distance. A cover 272 is attached to an inner surface of the overhang portion 270 and the cover 272 is biased towards the auxiliary opening 260 by a biasing element, such as a spring 252. When the cover 272 is in a closed position (FIG. 8), the cover 272 is disposed proximate the auxiliary opening 260 to prevent fluid flow through the auxiliary opening 260. When fluid pressure exceeds a predetermined threshold, the biasing force provided by the spring 252 is overcome and the cover 272 is pushed away from the auxiliary opening 260 so that fluid may flow through the secondary flow path 244, as illustrated in FIG. 9.

Figure 10:
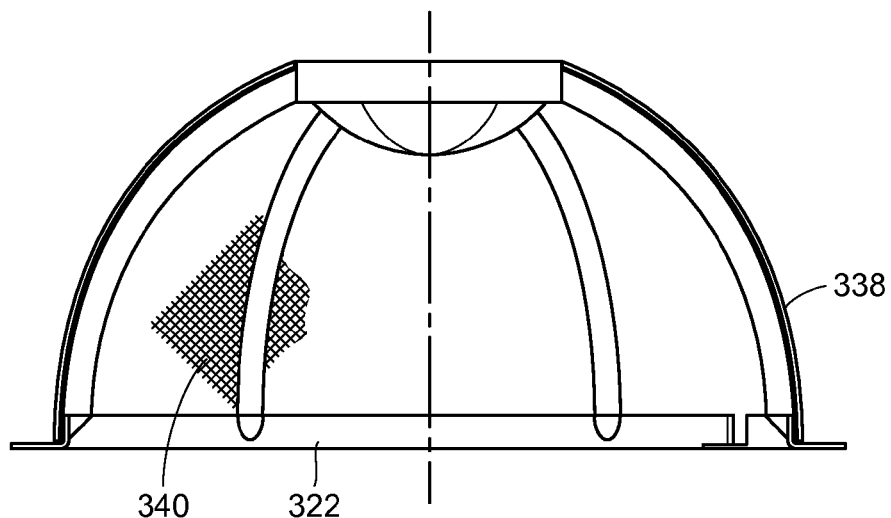
FIG. 10 is a side cross-sectional view of yet another alternate embodiment of a trim cage having a pressure relief mechanism, the trim cage having a dome-shape.
Figure 11:
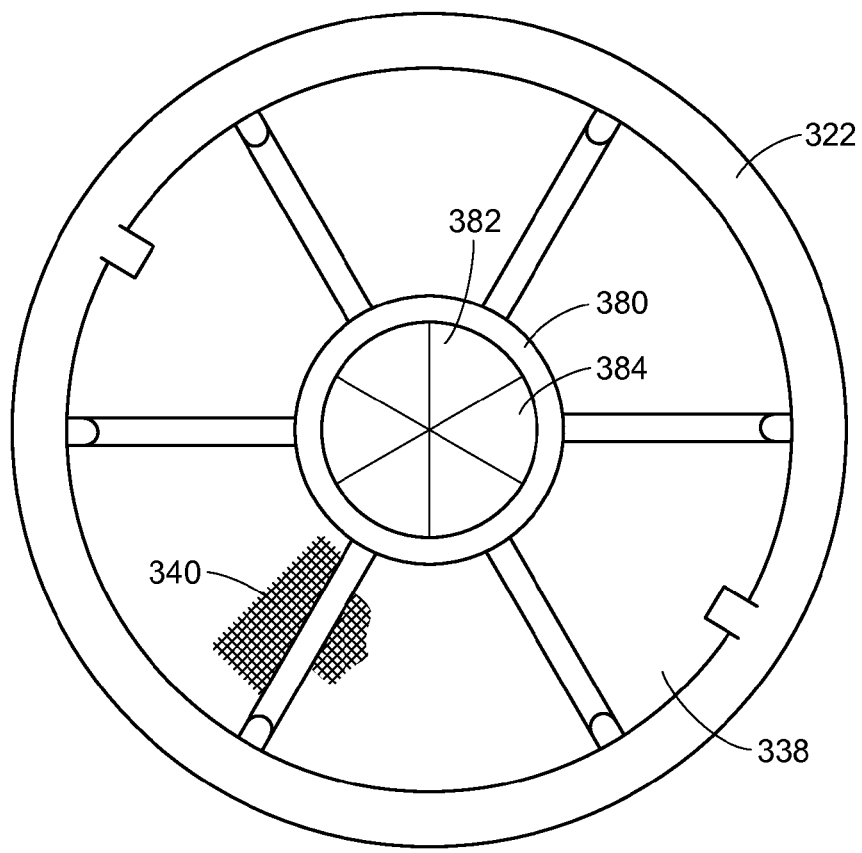
FIG. 11 is a bottom view of the trim cage of FIG. 10.

FIGS. 10 and 11 illustrate yet another embodiment of a cage 322. The cage 322 has a dome-shaped cage wall 338 that has an opening at one end. A circular relief 380 is located opposite the opening. A plurality of cage openings 340 is disposed in the cage wall 338. A pressure relief mechanism 382 is disposed in the circular relief 380. The pressure relief mechanism 382 includes a plurality of leaflets 384 that cooperate to close the circular relief 380. The leaflets 384 are biased to a closed position (illustrated in FIGS. 10 and 11). However, when fluid pressure exceeds a predetermined threshold, the leaflets 384 open to allow fluid to flow through the circular relief 380.

Although certain trim assemblies and control valves have been described herein in accordance with the teachings of the present disclosure, the scope of the appended claims is not limited thereto. On the contrary, the claims cover all embodiments of the teachings of this disclosure that fairly fall within the scope of permissible equivalents.

The invention claimed is:

1. A fluid valve comprising:
   a valve body having a fluid inlet and a fluid outlet connected by a fluid passageway;
   a trim assembly disposed within the fluid passageway; and
   a fluid control member movably disposed within the fluid passageway, the fluid control member cooperating with the trim assembly to control fluid flow through the fluid passageway;
   wherein the trim assembly includes a cage with a cage wall and a pressure relief mechanism disposed in the cage wall, the pressure relief mechanism comprising a gate.

2. The fluid valve of claim 1, wherein the gate is pivotably attached to the cage wall by a hinge.

3. The fluid valve of claim 2, wherein the hinge has an axis of rotation that is substantially parallel to a longitudinal axis of the cage wall.

4. The fluid valve of claim 3, wherein the gate is disposed in a notch formed in the cage wall.

5. The fluid valve of claim 4, wherein the gate is biased to a closed position by a biasing element.

6. The fluid valve of claim 5, wherein the biasing element is a spring.

7. The fluid valve of claim 6, wherein the spring is attached to a distal end of the gate.

8. The fluid valve of claim 7, wherein the cage wall includes a plurality of posts that separate the notches.

9. The fluid valve of claim 8, wherein the spring is attached to a post.

10. A cage for a control valve trim assembly, the cage comprising:
    a cage body having an opening at one end and a wall extending from the opening;
    a plurality of openings disposed in the wall; and
    a pressure relief mechanism disposed in the cage wall,
    wherein the pressure relief mechanism includes a gate that is pivotably attached to the cage wall.

* * * * *